April 26, 1955
H. J. MAILHOT ET AL
2,707,051
PRESSURE REGULATOR-FILTER DEVICE
Filed Nov. 3, 1952
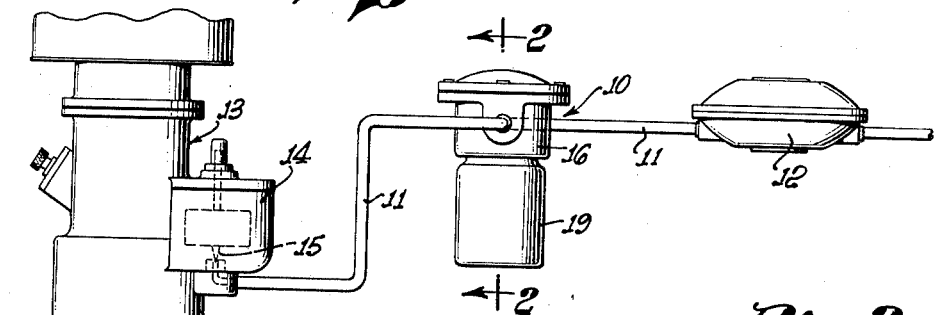
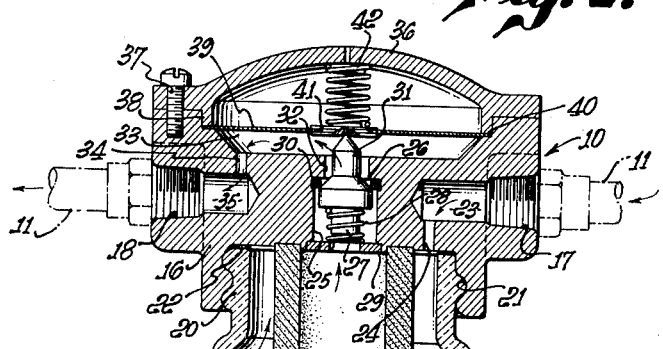
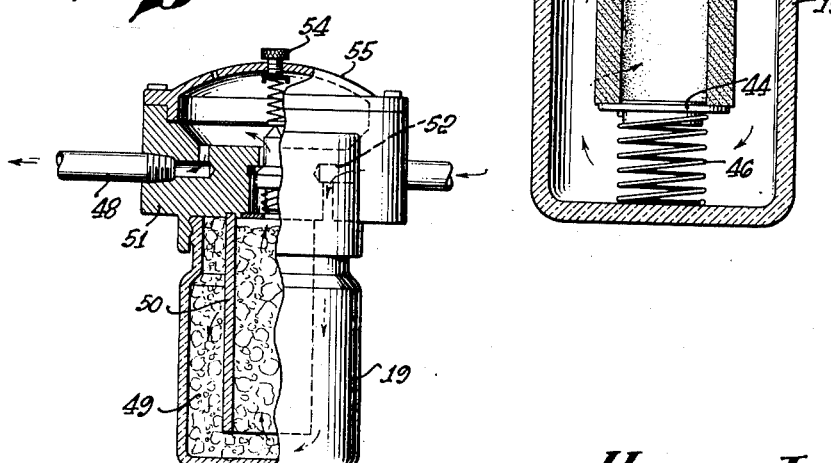
HAROLD J. MAILHOT,
ALBERT G. H. VANDERPOEL,
INVENTORS.
BY
ATTORNEY.

United States Patent Office 2,707,051
Patented Apr. 26, 1955

2,707,051
PRESSURE REGULATOR-FILTER DEVICE

Harold J. Mailhot and Albert G. H. Vanderpoel, Gardena, Calif.

Application November 3, 1952, Serial No. 318,362

4 Claims. (Cl. 210—166)

This invention has to do with a novel unitized pressure regulating and fluid filtering or contacting device, characterized primarily by its small size, compactness and adaptability to practical and low cost manufacture. Although adaptable to many uses where a fluid, liquid or gas, is to be filtered or otherwise treated, and discharged to an outlet purpose at constant pressure, the invention has been developed to have as one of its principal uses, that of a motor fuel pressure regulator and filter, and accordingly may be discussed preliminarily as applied to that typical adaptation.

Internal combustion engines commonly take their fuel from a fuel pump connecting with the carburetor float chamber into which the pump-pressurized fuel is admitted past the usual float controlled valve. Improper fuel delivery into the float chamber may result from conditions resulting from either or both excessive pump discharge pressures and dirt in the fuel stream. To illustrate, an over-pressurizing pump may deliver the fuel to the carburetor at a pressure sufficiently high to unseat the float valve against the closing force of the float, and thus cause flooding or excessively high fuel levels in the float chamber. And as indicated the presence of dirt in the fuel stream may prevent proper seating or positioning of the float valve to like effect.

One of our major objects is to insure against both of these conditions by a simple combined pressure regulating and filtering device conveniently installable in the fuel line between the pump and carburetor, and so constructed as to be available at sufficiently low cost as to warrant its use not only as against replacement or repair of an over-pressurizing fuel pump, but also as a safety control even when a pump may be functioning normally.

In accordance with the invention, the regulator-filter unit is reduced to the simple combination of a head connectible into the fuel line and containing a pressure regulator acting to maintain a constant proper fuel outlet pressure, and a chamber removably attached to the head and containing a filter medium or element so associated with the head passages that the inlet fuel flows through the filter in passing to the regulator. And all the necessary working parts may be limited to a single valve, a fluid pressure responsive diaphragm, and oppositely acting springs resisting opening and closing movement of the valve.

In general, the device is applicable to various uses where a small and low cost unit is desired for constant fluid pressure maintenance and filtering or other treatment of the fluid. As illustrative of other treatments, the chamber may contain a reagent, dessicant, chemical or other material through which the fluid, e. g. in this instance a gas, may be passed as for many purposes to be served in laboratory uses of the device.

All the features and objects of the invention, as well as the details of certain typical and illustrative embodiments thereof, will be understood from the following description throughout which reference is had to the accompanying drawings, in which:

Fig. 1 is a general view showing the pressure regulating and filtering unit installed in a fuel line between an engine carburetor and the gasoline pump;

Fig. 2 is an enlarged cross-sectional view of the device taken on line 2—2 of Fig. 1; and Fig. 3 is a view similar to Fig. 2 illustrating a variational form of the invention.

Referring first to Fig. 1, the regulator-filter unit generally indicated at 10 is shown to be connected into the fuel line 11 between the usual gasoline diaphragm pump 12 and the carburetor 13. The fuel being pumped through line 11 enters the carburetor float chamber 14 under control of any of the usual float valves conventionally indicated at 15. As previously indicated, excess discharge pressure developed by the fuel pump may tend to unseat or over-open the float valve 15, with consequent flooding or excessive liquid level build-up in the float chamber. As will appear, the device 10 is capable of delivering the fuel to the float chamber at a constant predetermined and safe operating pressure regardless of greater magnitude and variations of the pump pressure, and of assuring that the fuel going to the carburetor will be filtered free of any consequential solids.

As illustrated in Fig. 2, the device 10 comprises a head 16 having an inlet 17 and an outlet 18 connectible into the fuel line 11. Removably attached to the head is a chamber 19 preferably in the form of a glass or other transparent container having a threaded neck 20 screwed at 21 into the threaded bore of the head against a sealing gasket 22. The chamber 19 is in communication with the inlet 17 through bore 23 and passage 24 in the head.

The heads contain a centrally located counterbore 25 which receives the flow control valve 26 having a stem 27 surrounded by coil spring 28 which is confined between a supporting ring or washer 29 and the valve head to urge the valve upwardly in a closing direction. The valve seats against an O-ring 30 securely retained at the end of the counterbore within an annular recess 30a, to provide a reliably leak-proof seat for the valve. The valve has an upper pointed stem 31 extending with open clearance through the bore 32. Thus the valve controls fluid flow from the chamber 19 into a space 33 which communicates through passage 34 and bore 35 with the outlet 18, and has assured closure against its seat by virtue of the form and composition of the seat and the capacity of the valve to float freely in the bores 25 and 32.

The head 16 carries a cap 36 retained by screws 37 and having an annular flange 38 which clamps a flexible diaphragm 39 against the head shoulder 40. The diaphragm has a central metallic or other relatively rigid insert 41 slightly recessed on its under side to receive and bear against the pointed end of the valve stem 31. Upward deflection of the diaphragm in a valve closing direction is resisted by coil spring 42 confined between the cap 36 and diaphragm insert 41.

Chamber 19 contains a filter element 43 preferably in the form of a porous tube having a bottom closure 44 and pressed at its upper end against the head 16, as within an annular recess 45, by coil spring 46 confined between closure 44 and the bottom of the chamber.

As will be understood, springs 27 and 42 may be selected to have such differential compression resistances in relation to the area of diaphragm 39, as will maintain a predetermined fuel pressure, say in the order of 2 pounds per square inch, at the outlet 35. This pressure will be below the pump discharge pressure, but yet sufficiently high to assure adequate and safe pressure delivery of the fuel to the float chamber. Fuel entering the device 10 through the inlet 17 flows downwardly into the chamber 19 and then inwardly through the filter element 43 to be discharged under control of the head-contained pressure regulator, to the outlet 35. Any solids filtered out of the fuel accumulate in the chamber 19, and by reason of its ready detachability from the head, the chamber may be removed and cleaned whenever necessary.

Fig. 3 illustrates a variational form of the invention which essentially is similar to the showing in Fig. 2 with respect to the head structure and pressure regulator, but differing with respect to the material or medium contained in the chamber 19 for contact with the fluid passing therethrough. Here the device may be assumed to be adapted for use, as in conjunction with laboratory equipment, for treating or contacting a fluid, e. g. gas, with a reagent or material in the container 19, and for delivering the treated gas at constant pressure to the outlet line 48. In this instance the chamber 19 is shown to contain a reagent or material 49 such as a chemical, dessicant or the like, at the inside and outside of a baffle tube 50 depending from the head 51. Entering through the inlet passage at 52, the gas flows downwardly within the material 49 at the outside of the tube 50, and then upwardly therethrough to be dispensed at constant pressure by the head-contained regulator. In any instance where it is desired to vary the delivery pressure, spring 53 may be adjusted in its degree of compression as by screw 54 threaded through the cap 55 and varying against the spring.

We claim:

1. A fluid pressure control device of the character described, comprising a head having a fluid inlet and an outlet, a chamber removably attached to the underside of the head and communicating with said inlet, said head having a bottom surface disposed across the upper end of said chamber, said head containing a central counterbore extending upwardly above said bottom surface and forming a discharge passage leading upwardly from said chamber to the outlet, a valve seat formed in said passage in the head, an upwardly seating valve in said counterbore engageable with said seat, a spring acting to support and seat the valve, a cap attached to the head, a diaphragm held between the cap and head in exposure to the fluid pressure at the outlet side of the valve and freely engaging the end of the valve, a spring acting against the diaphragm to unseat the valve, said seat, valve, diaphragm, and springs all being located in the head higher than said bottom surface thereof, and a material contained in said chamber and contacted by the fluid flowing therein from the inlet to said discharge passage.

2. A device as defined in claim 1, in which the chamber contains a straight tubular element extending from the head downwardly within said material and terminating above the bottom of the chamber so that the inlet fluid passes downwardly outside and then upwardly through the element to the discharge passage.

3. A fluid pressure control device of the character described, comprising a head having a fluid inlet and an outlet, a chamber removably attached to the underside of said head and communicating with said inlet, said head having a bottom surface extending across the upper end of said chamber, means forming in said head a passage leading upwardly from said chamber and communicating with said outlet, a filter material contained in said chamber and contacted by the fluid flowing therein from the inlet to said passage, and a pressure regulator in said head including a downwardly facing valve seat in said passage, an upwardly seating valve controlling the fluid flow through said passage to the outlet and operable to maintain a substantially constant fluid outlet pressure, a diaphragm controlling the valve movement and exposed to the fluid pressure at the outlet side of the valve, a spring supporting said valve and urging it into point contact with said diaphragm, and a second spring resisting closing movement of said valve, said diaphragm, springs and valve all being located in the head above the bottom surface thereof.

4. A device as defined in claim 3 in which the material in the chamber comprises a straight tubular filter element extending from the head downwardly and terminating above the bottom of the chamber, said element being removably held against the underside of the head by a spring interposed between the element and the bottom of the chamber.

References Cited in the file of this patent

UNITED STATES PATENTS

| | | |
|---|---|---|
| 1,863,103 | Dowins | June 14, 1932 |
| 1,956,787 | Birch | May 1, 1934 |
| 2,005,445 | Wiederhofft | June 18, 1935 |
| 2,252,152 | Work | Aug. 12, 1941 |
| 2,617,640 | Hieger | Nov. 11, 1952 |